(12) United States Patent
Wu

(10) Patent No.: US 11,814,541 B2
(45) Date of Patent: Nov. 14, 2023

(54) HEAT-CURABLE POWDER COATING COMPOSITION AND PREPARATION METHOD THEREOF

(71) Applicant: FOSHAN YIKEJU NEW MATERIAL CO., LTD., Guangdong (CN)

(72) Inventor: Ming Wu, Guangdong (CN)

(73) Assignee: FOSHAN YIKEJU NEW MATERIAL CO., LTD., Foshan (CN)

( * ) Notice: Subject to any disclaimer, the term of this patent is extended or adjusted under 35 U.S.C. 154(b) by 0 days.

(21) Appl. No.: 17/912,530

(22) PCT Filed: Mar. 31, 2021

(86) PCT No.: PCT/CN2021/084715
§ 371 (c)(1),
(2) Date: Sep. 19, 2022

(87) PCT Pub. No.: WO2022/160461
PCT Pub. Date: Aug. 4, 2022

(65) Prior Publication Data
US 2023/0136571 A1    May 4, 2023

(30) Foreign Application Priority Data

Feb. 1, 2021   (CN) .......................... 202110133348.8

(51) Int. Cl.
| | | |
|---|---|---|
| *C09D 7/65* | (2018.01) | |
| *C09D 7/63* | (2018.01) | |
| *C09D 7/80* | (2018.01) | |
| *C09D 167/02* | (2006.01) | |
| *C09D 5/03* | (2006.01) | |

(52) U.S. Cl.
CPC ............... *C09D 5/033* (2013.01); *C09D 7/63* (2018.01); *C09D 7/65* (2018.01); *C09D 7/80* (2018.01); *C09D 167/02* (2013.01)

(58) Field of Classification Search
CPC . C09D 5/033; C09D 7/65; C09D 7/63; C09D 7/80; C09D 167/02

USPC .......................................................... 524/539
See application file for complete search history.

(56) References Cited

FOREIGN PATENT DOCUMENTS

| CN | 1708401 | A | | 12/2005 | |
|---|---|---|---|---|---|
| CN | 105209513 | A | | 12/2015 | |
| CN | 105324426 | A | | 2/2016 | |
| CN | 111484603 | A | | 8/2020 | |
| CN | 111630081 | A | * | 9/2020 | ......... C08G 18/4211 |
| CN | 111630081 | A | | 9/2020 | |
| EP | 3663326 | A1 | | 6/2020 | |
| WO | 2019145472 | A1 | | 8/2019 | |

OTHER PUBLICATIONS

International Search Report of PCT Patent Application No. PCT/CN2021/084715 dated Nov. 1, 2021.
1st Office Action of counterpart Chinese Patent Application No. 202110133348.8 dated Mar. 18, 2021.
Notice of Allowance of counterpart Chinese Patent Application No. 202110133348.8 dated May 13, 2021.

* cited by examiner

*Primary Examiner* — Kelechi C Egwim

(57) ABSTRACT

The invention relates to the field of powder coatings, and specifically discloses a heat-curable powder coating composition and a preparation method thereof. The powder coating composition comprises: i) component A comprising at least one amorphous solid polyester resin compound having a Michael donor reactive group; ii) component B comprising at least one amorphous ethylenically unsaturated solid polyester resin with a Michael acceptor reactive group; iii) component C comprising at least one (semi) crystalline solid reactive diluent; iv) component D comprising at least one epoxy group-containing solid substance; v) component E comprising at least one basic catalyst. The present invention also discloses a preparation method of the above heat-curable powder coating composition. By adopting the invention, ultra-low temperature curing can be realized. The curing temperature is as low as 90-110° C., and the curing time is short.

14 Claims, 2 Drawing Sheets

HEAT-CURABLE POWDER COATING COMPOSITION AND PREPARATION METHOD THEREOF

TECHNICAL FIELD

The invention relates to the technical field of powder coatings, in particular to a heat-curable powder coating composition and a preparation method thereof.

BACKGROUND

Powder coatings are environmentally friendly coatings because they do not use organic solvents as in traditional solvent-based coatings and there is almost no VOCs emission to the atmospheric environment. Besides, oversprayed powder coatings can be recycled, and the use efficiency is close to 100%, avoiding the problem of recycling and disposing solid hazardous waste generated by overspray of liquid coatings, which is very difficult to deal with. Therefore, powder coatings have been vigorously developed as a green environmental protection coating for controlling source of air pollution and solid hazardous waste.

Powder coating composition is applied by an electrostatic spraying method. Powder coating is dispersed in air flow to obtain powder coating particles that are electrostatically charged through an electric field. The charged powder coating particles are coated on workpieces to be coated and then heated to melt and leveled to form a powder coating.

Powder coatings may be thermoset or thermoplastic, and the present invention relates to the field of thermoset powder coating compositions. A thermosetting powder coating composition refers to a mixture of components having an ability to form an irreversible crosslinked network after heat curing in the absence of a thermal radical initiator.

Since the 1990s, efforts have been continuously invested in research on the application of powder coatings on heat-sensitive substrates such as wood and plastic. The earliest solution was to use ultraviolet radiation curable powder coatings on wood surfaces. The coating is cured by UV radiation after heating at 100-130° C. and leveling for 3-5 minutes. However, for powder coatings with high coloring requirements, ultraviolet radiation is difficult to penetrate the coating, resulting in uneven curing of the powder coating. And ultraviolet radiation is also likely to cause the color of the coating to turn yellow. UV curing cannot be achieved on complex 3D workpieces. So there has been no large-scale commercial application of UV-curable powder coatings for more than 30 years.

Heat-curable powder coatings at low temperatures below 130° C. have become an alternative solution to overcome the shortcomings of UV-curable powder coatings. The patent of DSM corporation in the Netherlands has published a powder coating composition containing a crystalline polyester resin, an amorphous polyester resin, a cross-linking agent and a thermal radical initiator, which can be cured at 80-130° C. But the extruding temperature of the powder coating composition in the mixing and melt-extrusion process is 60-100° C., very close to the heat curing temperature of 70-130° C. of this low-temperature powder coating composition. During the mixed melt-extrusion process, it is easy to cause the thermal radical initiator in the powder coating composition to decompose and generate free radicals which initiate the powder coating composition to crosslink and cure. Besides, after the melt-extrusion and mixing process, recrystallization of the crystalline resin in the powder coating composition is difficult and time-consuming, which makes it difficult to pulverize the powder coatings, so large-scale commercial applications have not been achieved.

Under catalyst-promoted conditions, conventional heat curing polyester-epoxy hybrid systems or thermal radical initiation can realize thermal curing at 120-150° C. Since the temperature during the application and transportation of powder coatings is up to 40° C., the glass transition temperature $T_g$ of the powder coating composition must be at least 50° C. or higher. Otherwise, in hot summer at 30-40° C., powder coatings are easy to aggregate and cannot be applied, and the storage stability is poor. In order to meet the powder coating application, storage and transportation requirements, the glass transition temperature of the powder coating composition should exceed 50° C. It is well known to the skilled in the powder coating industry that the addition of a relatively large amount of amine catalysts or onium salt catalysts is needed to reduce the curing temperature of the traditional low temperature (120-150° C.) cured polyester/epoxy resin. But the catalysts in large quantities will reduce the glass transition temperatures of the powder coating compositions. Therefore, only the low-temperature powder coating composition whose main resin has a glass transition temperature of 50-65° C. can meet the above requirements. It makes a melt-extrusion temperature of the powder coating composition reach 80-110° C., which almost overlaps with the heat curing temperature of 90-110° C. of the low-temperature powder coating composition of the present invention. Therefore, the low-temperature powder coating composition of the present invention cannot be developed based on the chemical principle the existing disclosed low-temperature powder coating composition uses, and cannot be obtained by adopting the mixing, melt-extrusion and grinding processes of traditional powder coating production.

Those skilled in the powder coating industry are aware that the traditional epoxy/polyester hybrid powder coating compositions thermally curable at low temperatures below 120° C. are based on the ring-opening polymerization mechanism of ionic epoxy groups due to the necessity to add a relatively large quantity of amine or onium salt catalysts. Storage of powder coating composition at room temperature of 23° C. will cause an epoxy group ring-opening reaction, resulting in loss of powder coating gloss, or even serious pre-reaction phenomena such as sanding and non-curing. The traditional low-temperature heat curing epoxy/polyester hybrid powder coatings need to be stored under the condition of 4-20° C. for not more than 30 days. At ambient temperature, the powder coating is prone to lose efficacy and loss gloss, making it difficult to reuse the powder coatings during a normal coating process at a room temperature of 23-40° C.

Michael addition reaction mechanism is well known to coating engineers, and there are many research achievements and patents on its application in the liquid coating area. Patent CN105324426A publishes a cross-linkable liquid coating composition based on Michael addition reaction, comprising at least two reactive unsaturated group components (Michael addition reaction acceptor groups), and at least two acidic protons C—H in activated methylene or methine (Michael addition reaction donor groups), basic component C, which is a salt of a base nucleophile anion X- from an X—H acidic group-containing compound, wherein X is N, P, O, S, etc.; Ashland Corporation of the United States discloses in patent CN1708401A a liquid coating composition which uses a catalyst system comprising quaternary amine, phosphonium, sulfur salts and the like, and an epoxy moiety-containing resin to promote the Michael addition reaction of a donor compound containing an acetoacetate functional group and a multifunctional acrylate acceptor compound.

In addition, Allnex Corporation disclosed a low-temperature powder coating composition based on Michael addition reaction mechanism in patent WO2019/145472A1, comprising at least two reactive unsaturated groups (Michael addition reaction acceptor group), at least two acidic protons C—H in activated methylene or methine (Michael addition reaction donor group), and a latent catalyst system containing carboxylate obtained by amine, phosphonium, sulfur reacting with a carboxylic acid, epoxy group resin and carboxylic acid, wherein the carboxylate (basic component) is a salt of a basic nucleophile anion X- from an X-H acidic group-containing compound, wherein X is N, P, O, S, etc. The basic component and the epoxy resin containing an epoxy group synergistically promote the Michael addition reaction; at the same time, it is necessary to add excess carboxylic acid to neutralize the basic component to control the reaction activity of the coating composition, to inhibit possible cross-linking pre-reactions that may occur during melt-extrusion and mixing of the powder coating compositions production, and to extend the cure time window during coating and curing to provide good leveling coatings. The composition of patent WO2019/145472A1 (namely CN111630081A) adopts the same Michael addition reaction mechanism disclosed in liquid coating patent CN105324426A and patent CN1708401A.

The problem that liquid coatings face when adopting Michael addition reaction is that the reaction speed of Michael addition reaction is too fast at room temperature, and the coating has no leveling window. It is necessary to add a reaction inhibitor to control the reaction speed. But powder coatings are solid at room temperature, which needs to be heated to melt into a fluid with suitable viscosity, so that the molecules of the reaction components can be mixed and form intermolecular contacts to reach a level of the one in the liquid coatings to initiate the Michael addition reaction. Therefore, the technical problems faced by the Michael addition reaction in the application of powder coatings is very different from the technical problems faced by liquid coatings. It is impossible to produce powder coating compositions that can be thermally cured at 90-110° C. by using the same reaction mechanism as liquid coatings.

The production process of the low-temperature powder coating disclosed in the patent WO2019/145472A1 adopts the traditional melt-extrusion method. The twin-screw extruder has four-barrel zone temperatures, the first zone is 15° C., the second zone is 25° C., the third zone is 80° C. and the fourth zone is 100° C. The extruding opening is at a temperature of 100° C. The glass transition temperature of the powder coating composition disclosed in the above patent is 36-55° C., and the melt-extruded powder coating composition is pulverized and electrostatically coated to obtain a film coating in a thickness of 60-80 microns at a curing temperature of 120-160° C., and it takes 20 minutes for the curing and cross-linking. The temperatures of the third zone and the fourth zone need to be raised to 80-100° C. for melt-extrusion when producing the powder coating composition in the above-mentioned patent. It overlaps with the curing temperature of 90-110° C. for the low-temperature powder coating of the present invention. It is well known to those skilled in the powder coating industry that when the melting temperature of the powder coating composition is in a range overlapping with the curing temperature, it is impossible to achieve a low-temperature powder coating composition that is heat-curable at 90-110° C. in 3-10 minutes through the melt-extrusion method.

It is recorded in paragraph [00252] of patent WO2019/145472A1 that the powder coating composition can only be cured at 95-102° C. in a solvent, which is a butyl acetate solvent. However, the powder coating compositions without any solvent added were all cured at about 120° C.

SUMMARY OF THE INVENTION

The technical problem to be solved by the present invention is to provide a heat-curable powder coating composition, which can be cured at an ultra-low temperature of as low as 90-110° C. in a short curing time.

The technical problem to be solved by the present invention is also to provide a heat-curable powder coating composition that can form a powder coating with well-balanced performances of leveling, adhesion, flexibility and hardness after curing, and has a high degree of coloration. The powder coating composition has good storage stability, and can be applied to non-heat-sensitive materials, heat-sensitive materials and 3D workpieces.

The technical problem to be solved by the present invention is also to provide a preparation method of the heat-curable powder coating composition, which is simple, can be used in large-scale industrial applications, and has low cost.

In order to achieve the above technical effect, the present invention provides a heat-curable powder coating composition, comprising:
  i) Component A, comprising at least one amorphous solid polyester resin having a Michael donor reactive group;
  ii) Component B, comprising at least one amorphous ethylenically unsaturated solid polyester resin having a Michael acceptor reactive group;
  iii) Component C, comprising at least one (semi) crystalline solid reactive diluent;
  iv) Component D, comprising at least one solid substance containing an epoxy group;
  v) Component E, comprising at least one basic catalyst.

As an improvement of the above scheme, component C comprises at least one (semi) crystalline vinyl functionalized polyurethane resin.

As an improvement of the above scheme, component C comprises at least one (semi) crystalline vinyl ether functionalized polyurethane resin containing vinyl ether functional groups.

As an improvement of the above scheme, component C is a product of a reaction between a compound containing a vinyl ether group or a vinyl ester group or a vinyl ether-ester group and/or a derivative of the compound, and an isocyanate group-containing compound and/or a derivative of the isocyanate group-containing compound.

The isocyanate group-containing compound is one or more selected from the group consisting of toluene diisocyanate, hexamethylene diisocyanate and isophorone diisocyanate. Preferably, the toluene diisocyanate is a mixture of toluene 2,6-diisocyanate and toluene 2,4-diisocyanate.

The compound containing the vinyl ether group is one or more selected from the group consisting of 6-hydroxyhexyl vinyl ether, 4-hydroxybutyl vinyl ether, 2-hydroxyethyl vinyl ether, and diethylene glycol monovinyl ether.

As an improvement of the above scheme, component C is obtained by the following method:
  Adding a compound with a vinyl ether group, an auxiliary agent and water into a reaction apparatus, stirring under nitrogen protection, and heating to 35-50° C.;

Slowly adding dropwise an isocyanate group-containing compound to the reaction apparatus at a temperature of 35-50° C.;

After adding the isocyanate group-containing compound, keeping the temperature of the reaction apparatus lower than 110° C. for 30 minutes, and then removing low molecular weight volatiles by vacuuming to obtain a final product.

As an improvement of the above scheme, component C satisfies at least one of the following conditions:
a. component C has a number average molecular weight Mn of 100-8000 Da;
b. the vinyl ether group of component C has an equivalent weight of 100-4000 g/mol;
c. component C has a melting point of 30-110° C., and a crystallization point of 20-80° C.;
d. component C has a viscosity of 0.01-20 Pa·s at 100° C.

As an improvement of the above scheme, component A comprises at least one amorphous solid polyester resin having 2 or more acidic C-H Michael donor reactive groups, and the molecular structure of the group is as follows:

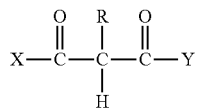

Wherein, R is H, alkyl or aryl, X and Y can be the same or different groups, X and Y are alkoxy, alkyl, aryl or aralkyl.

As an improvement of the above scheme, component A comprises at least one amorphous solid polyester resin having 2 or more acidic C-H Michael donor reactive groups provided by malonic acid, acetoacetic acid, malonamide, acetamide or cyanoacetate.

As an improvement of the above scheme, component A satisfies at least one of the following conditions:
a. component A has a number average molecular weight Mn of 500-20000 Da;
b. the acidic C-H Michael donor reactive group of component A has an equivalent weight of 150-15000 g/mol;
c. component A has a glass transition temperature $T_g$ of 30-110° C.;
d. component A has a viscosity of less than 400 Pa·s at 160° C.

As an improvement of the above scheme, component B comprises at least one amorphous ethylenically unsaturated solid polyester resin having 2 or more unsaturated C=C Michael acceptor reactive groups.

As an improvement of the above scheme, component B is an amorphous ethylenically unsaturated solid polyester resin formed by copolymerization of acrylic acid and a butenedioic acid monomer, and the butenedioic acid monomer includes fumaric acid and maleic acid.

As an improvement of the above scheme, component B satisfies at least one of the following conditions:
a. component B has a number average molecular weight Mn of 500-20000 Da;
b. an unsaturated C=C functional group of the B component has an equivalent weight of 150-15000 g/mol;
c. component B has a glass transition temperature $T_g$ of 30-110° C.;
d. component B has a viscosity of less than 400 Pa·s at 160° C.

As an improvement of the above scheme, component D is an epoxy resin containing an epoxy group, an acrylic polyester containing an epoxy group or an epoxy curing agent.

As an improvement of the above scheme, component D is an epoxy resin containing an epoxy group, and the epoxy resin containing the epoxy group is one or more selected from the group consisting of bisphenol A type epoxy resin, bisphenol F type epoxy resin, phenolic modified epoxy resin and glycidyl ester epoxy resin;

The epoxy resin containing the epoxy group and the acrylic polyester containing the epoxy group have a number average molecular weight of 200-2000 Da, and an epoxy equivalent weight of 100-1000 g/equivalent.

As an improvement of the above scheme, component D is an epoxy curing agent, and the epoxy curing agent is one or more selected from the group consisting of triglycidyl isocyanurate and polyglycidyl benzoate.

As an improvement of the above scheme, component E comprises at least one basic catalyst promoting the ring-opening reaction of an epoxy resin at 70-100° C.

As an improvement of the above scheme, component E is a tertiary amine catalyst or a tertiary phosphine catalyst, whose general structural formula is $X(R)_3$, X is N or P element, R is the same or different alkyl, aryl or aralkyl groups containing 1-8 carbon atoms, or component E is an imidazole catalyst.

As an improvement of the above scheme, a total amount of component A, component B and component C added is 100 wt %; wherein, component D is added in an amount of 0.1-50 wt % of the total amount of component A, component B and component C; component E is added in an amount of 0.05-30 wt % of the total amount of component A, component B and component C.

As an improvement of the above scheme, component A is added in an amount of 1-90 wt %, component B is added in an amount of 0.5-90 wt %, and component C is added in an amount of 0.1-60 wt %, wherein, the total amount of component A, component B and component C added is 100 wt %; wherein, component D is added in an amount of 3-40 wt % of the total amount of component A, component B and component C; and component E is added in an amount of 0.3-15 wt % of the total amount of component A, component B and component C.

As an improvement of the above scheme, component A is added in an amount of 10-65 wt %; component B is added in an amount of 5-60 wt %; component C is added in an amount of 2-30 wt %;

As an improvement of the above scheme, component D is added in an amount of 3-40 wt % of the total amount of component A, component B and component C.

Component E is added in an amount of 0.3-15 wt % of the total amount of component A, component B and component C.

As an improvement of the above scheme, the powder coating composition also includes: component H, which comprises one or more selected from the group consisting of a filler, a pigment, and an auxiliary agent.

Correspondingly, the present invention also discloses a preparation method of the heat-curable powder coating composition, comprising:
1) dividing component D into component F and component G with the same or different weights;
2) mixing component A, component B, component C, component E and component F together to obtain a first premix;
3) mixing-extruding the first premix, and cooling to ambient temperature to obtain an extrudate;

4) pulverizing the extrudate after cooling to obtain a first powder particle;
5) pulverizing component G to obtain a second powder particle;
6) mixing the first powder particle and the second powder particle, and pulverizing to obtain a powder coating composition as a finished product.

As an improvement of the above scheme, component F is used in 1-35 wt % of the total amount of component A, component B and component C, and component G is used in 1-35 wt % of the total amount of component A, component B, component C.

As an improvement of the above scheme, a particle size $D_{50}$ of the first powder particle is 15-130 μm; a $D_{50}$ particle size of the second powder particle is 1-130 μm.

As an improvement of the above scheme, component G is pulverized by a supersonic jet mill to obtain the second powder particle;

The first powder particle and the second powder particle are mixed, and then pulverized by a fluid jet mill to obtain a finished powder coating composition.

The present invention has the following beneficial effects:

1. The present invention includes component A, component B, component C, component D and component E, wherein component A comprising an amorphous solid polyester resin provides a Michael donor reactive group, component B comprising an amorphous ethylenically unsaturated solid polyester resin provides a Michael acceptor reactive group, component C comprises at least one (semi) crystalline solid reactive diluent, component D is a solid substance containing an epoxy group, and component E is a basic catalyst, wherein component C of the present invention is not a conventionally adopted latent catalyst system, but a solid reactive diluent of (semi) crystalline vinyl ether functionalized polyurethane resin, which can reduce the melt viscosity of the powder coating composition at 90-110° C. and enable the molecular mixing and intermolecular contact of each reaction component to reach a level of the one in liquid coatings, which can make the Michael addition reaction complete quickly, thereby ensuring that the low-temperature powder coating composition is heat cured to an acceptable level at 90-110° C. in 3-10 minutes.

2. Under a dry storage condition at room temperature, the lower the curing temperature of the powder coating comprising the traditional polyester-epoxy mixed reaction system, the easier it is to lose its gloss. The powder coating cured below 120° C. will lose its gloss within 7 days. The present invention identifies the key component that affects the curing and crosslinking reaction of the low-temperature powder coating composition: component D with an epoxy group. Only part of component D was added during the melt-extrusion process of the powder coating composition preparation at 80-100° C., and the remaining part of component D was added by dry mixing then jet pulverized together with the other components. The melt-extrusion mixing and the dry mixing followed by jet pulverization have a huge difference in dispersion effect, leading to a huge difference in intermolecular contact and molecular thermal motion in the low-temperature powder coating composition, thereby reducing the polymerization speed of the low-temperature powder coating system at room temperature, which promotes the gloss stability during storage and prolongs the storage time of the low-temperature powder coating.

3. After the powder coating composition of the present invention is heat cured, a powder coating with well-balanced performances of leveling, adhesion, flexibility and hardness and the like is obtained, which has an excellent colorability, and can be applied to non-heat-sensitive or heat-sensitive materials such as metal, wood, plastic, calcium silicate, etc., even 3D complex workpieces. The powder coating composition has a wide range of applications and good decorative effects.

4. The preparation method of the powder coating composition of the present invention includes: firstly dividing component D into component F and component G with the same or different weights; then mixing component A, component B, component C, component E and component F together to obtain a first premix; mixing-extruding the first premix and cooling to ambient temperature to obtain a cooled extrudate; and pulverizing the cooled extrudate to obtain a first powder particle; furthermly, pulverizing component G to obtain a second powder particle, and finally mixing the first powder particle and the second powder particle and pulverizing to obtain a finished product. The above preparation method is simple, can be used in large-scale industrial applications, and has a low cost. A prepared coating composition can be heat cured to an acceptable level at 90-110° C. in 3-10 minutes to obtain a powder coating with a well-balanced performance of leveling, adhesion, flexibility, hardness and the like, and having excellent colorability. It can be applied to non-heat-sensitive or heat-sensitive materials such as metal, wood, plastic, calcium silicate, and even 3D complex workpieces, and has a wide range of applications and good decorative effects.

DETAILED DESCRIPTION OF ILLUSTRATED EXAMPLES

Figure 1:
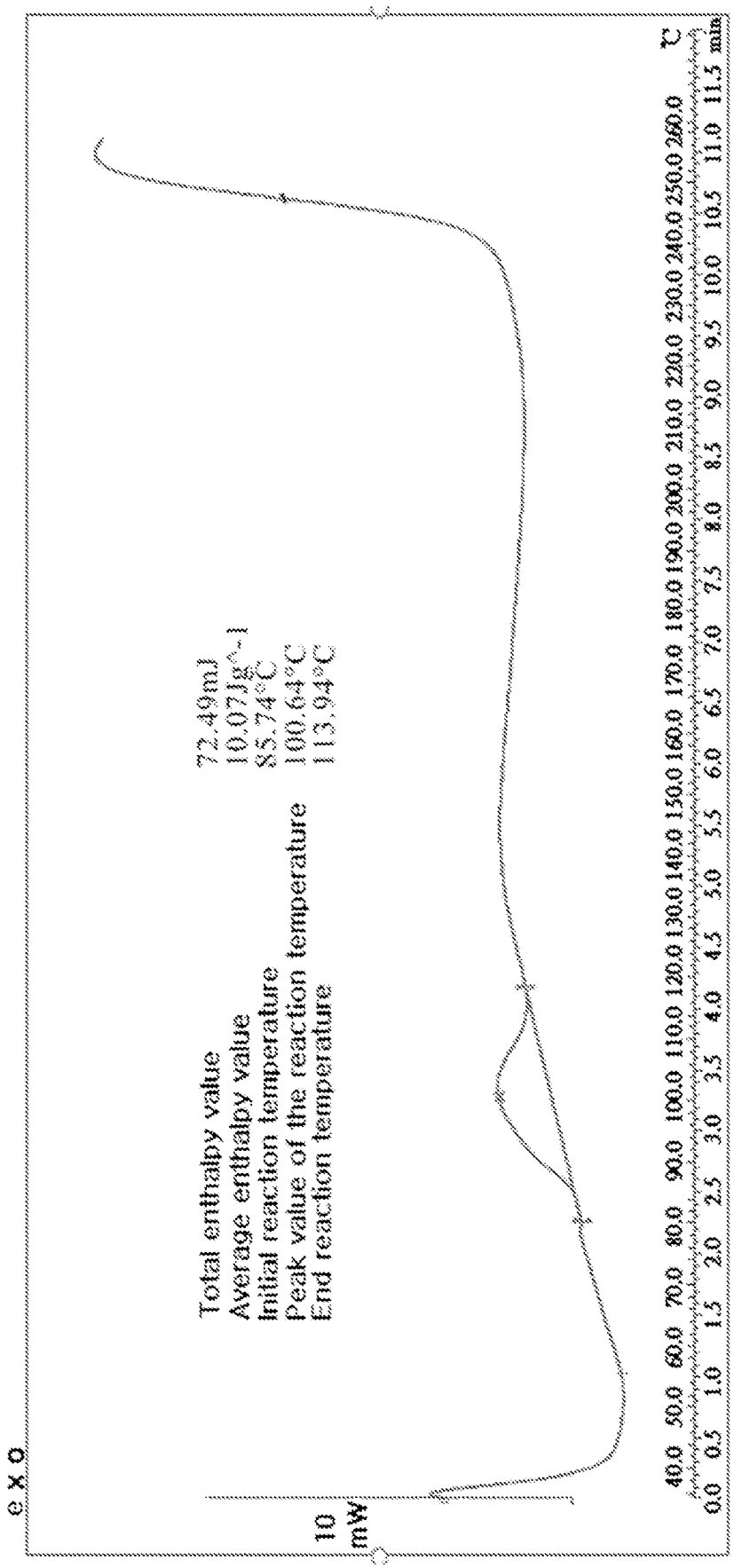
FIG. 1 is a differential thermal scan (DSC) graph of a heat-curable powder coating composition of the present invention.

In order to make the objectives, technical solutions and advantages of the present invention clearer, the present invention will be described in further detail below.

The present invention provides a heat-curable powder coating composition, which can be heat cured at 90-110° C. in 3-10 minutes, and specifically includes:
  i) Component A, comprising at least one amorphous solid polyester resin having a Michael donor reactive group;
  ii) Component B, comprising at least one amorphous ethylenically unsaturated solid polyester resin having a Michael acceptor reactive group;
  iii) Component C, comprising at least one (semi) crystalline solid reactive diluent;
  iv) Component D, comprising at least one solid substance containing an epoxy group;
  v) Component E, comprising at least one basic catalyst;
  wherein, a total amount (wt %) of i)+ii)+iii) is equal to 100%, and component D and component E is in a wt % based on the total amount of i)+ii)+iii).

In order to better explain the technical solution, some technical terms in the present invention are defined as:

"Room temperature" refers herein to 23° C.

"Ambient temperature" herein refers to 23° C. to 35° C.

"Cure to an acceptable level at low temperature" means that the powder coating is resistant to at least 100 double rubs with acetone when cured at up to 110° C. for up to 10 minutes.

"Good adhesion" herein refers to an adhesion measured by the cross-cut test according to ISO 2409, and on a scale from 0 (best) to 5 (worst), the adhesion of the powder coating is in a range of 0-2, more preferably in a 0-1 range.

"Curing" as used herein refers to the process by which a coating forms an irreversible cross-linked network after a chemical reaction, wherein the coating material no longer flows, melts, or dissolves, and "cured" and "cross-linked" are used interchangeably herein. The heat-curable powder coating composition of the present invention is cured using heat, referred to as "heat curing," excluding ultraviolet (UV), electron beam, thermal free radical initiator-induced curing.

"Good leveling performance" herein refers to a leveling property equal to or higher than grade 3, more preferably equal to or higher than grade 4, even more preferably equal to or higher than grade 5, most preferably equal to or higher than grade 6, on a scale of 1 (worst leveling) to 10 (best leveling) according to a conventional leveling property grading method.

"Resin" may be understood herein as having the same meaning as understood by one of ordinary skilled in heat-curable polymer chemistry, a polymer having reactive groups capable of being cross-linked by heat curing. The molecular weight of the resin can be characterized by number average molecular weight (Mn) or weight average molecular weight (Mw) well known to those of ordinary skilled in heat-curable polymer chemistry.

"Composition" as used herein refers to a combination and/or mixture of different chemical substances and/or components that form a whole substance.

"Powder" in this article refers to the state of fine, loose particles, with good fluidity without aggregation at room temperature of 23° C. to 40° C., and can be painted by traditional electrostatic powder coating processes; where a single particle size is up to 130 μm at room temperature and atmospheric pressure, the method used to measure the particle size of the powder material of the invention is sieve analysis.

A "heat-curable powder coating composition" refers herein to a composition in powder form that can be cured by heat. The compositions of the present invention are heat-curable composition.

"Amorphous, (semi)crystalline" is a term known herein to those of ordinary skill in heat-cured polymer chemistry to characterize the main characteristic of polymers in terms of crystallinity. "Amorphous" indicates a polymer has no melting point, and is characterized by glass transition temperature; while (semi) crystalline" has a melting point and a crystallization point, which can be measured by DSC.

"Ethylenically unsaturated" refers to a cis or trans reactive C=C carbon-carbon double bond unsaturated group that does not contain aromatic unsaturated group.

"Reactive group" as used herein refers to a group that participates in epoxy ring-opening and Michael addition reactions. The reactive group of component A of the present invention refers to a C-H acidic proton donor group provided by malonic acid, acetoacetic acid, malonamide, acetamide, cyanoacetate, etc.; the reactive group of component B of the present invention refers to an unsaturated C=C olefinic acceptor group; the reactive group of component C of the present invention refers to a vinyl ether or ester group; the reactive group of component D of the present invention refers to an epoxy group.

"Equivalent weight per unit reactive group" herein is obtained by a calculation of dividing the number average molecular weight Mn of a polymer by the amount of reactive groups added during synthesis of the polymer.

"Unsaturated resin" as used herein refers to a resin containing an ethylenically unsaturated group.

"Main resin composition" as used herein refers to a composition comprising a solid amorphous polyester resin containing 2 or more acidic C-H protons from activated methylene or methine groups and at least one amorphous ethylenically unsaturated solid polyester resin containing 2 or more reactive unsaturated C=C groups.

"Solid reactive diluent" herein refers to a resin component that can participate in the curing and crosslinking reaction of the main resin composition, reduce the melt viscosity of the powder coating reaction system, and increase the reaction speed of the coating system. Its melting point is lower than or equivalent to the curing temperature of the low-temperature powder coating composition, and its melt viscosity at 100° C. is not higher than 200 mPa·s, which can reduce the melt viscosity of the low-temperature powder coating composition system. A "solid reactive diluent" is solid at room temperature.

"Powder coating" herein refers to a partially or fully cured form of the heat-curable powder coating composition of the present invention.

Additionally, the glass transition temperature $T_g$, melting point ($T_m$), crystallization temperature ($T_c$) described herein can be measured by differential scanning calorimetry (DSC).

"Viscosity" has no special specification, and herein refers to the melt viscosity (in Pa·s) at 160° C. Viscosity was measured using a rotational rheometer Brookfield CAP 2000+ with a rotational speed of 200 rpm and a 5 #rotor of 19.07 mm.

The components of the heat-curable powder coating composition of the present invention are further described below.

Component A comprises at least one amorphous solid polyester resin having a Michael donor reactive group, the function of which is to provide a Michael donor reactive group. Component B comprises at least one amorphous ethylenically unsaturated solid polyester resin having a Michael acceptor reactive group, the function of which is to provide a Michael acceptor reactive group. It should be noted that the embodiments of component A and component B are various, as long as they can provide donor reactive groups and acceptor reactive groups, so that the Michael addition reaction can occur.

Component C comprises at least one (semi) crystalline vinyl functionalized polyurethane resin. Preferably, the (semi) crystalline vinyl functionalized polyurethane resin is selected from but not limited to the group consisting of a vinyl ether functionalized polyurethane resin, a vinyl ester functionalized polyurethane resin, and a vinyl ether-ester functionalized polyurethane resin; more preferably the group consisting of a vinyl ether functionalized polyurethane resin and a vinyl ether-ester functional polyurethane resin; further preferably vinyl ether functionalized polyurethane resin.

Component C comprises at least one (semi) crystalline vinyl functionalized polyurethane resin. Preferably, the (semi) crystalline vinyl ether functionalized polyurethane resin comprises a (semi) crystalline polyurethane resin end-capped with a vinyl ether functional group, a vinyl ester functional group or a vinyl ether-ester functional group, more preferably a (semi) crystalline polyurethane resin end-capped with a vinyl ether functional group or a vinyl ether-ester functional group, further preferably a (semi) crystalline polyurethane resin end-capped with a vinyl ether functional group. That is, component C of the present invention preferably comprises at least one (semi)crystalline vinyl ether functionalized polyurethane resin containing a vinyl ether functional group.

Said component C comprises at least one (semi) crystalline vinyl functionalized polyurethane resin, preferably a product of a reaction among an isocyanate group-containing compound and/or derivatives thereof, a compound containing a vinyl ether group or a vinyl ester group or a vinyl ether-ester group and/or derivatives thereof, and a hydroxyl-containing mono or polyol. More preferably, component C is a product of the reaction between an isocyanate group-containing compound or derivatives thereof and a compound containing a vinyl ether group or a vinyl ester group or a vinyl ether-ester group or derivatives thereof. Further preferably, component C is a product of the reaction between a compound containing a vinyl ether group or derivatives thereof and an isocyanate group-containing compound or derivatives thereof.

Wherein, the isocyanate group-containing compound used for the preparation of (semi) crystalline vinyl functionalized polyurethane resin includes but is not limited to monomeric or polymeric isocyanates, preferably one or more selected from the group consisting of toluene diisocyanate, hexamethylene diisocyanate and isophorone diisocyanate. Wherein, the toluene diisocyanate is preferably a mixture (TDI) of toluene 2,6-diisocyanate and toluene 2,4-diisocyanate, whose added proportions are preferably 0.01-99.99% and 0.01-99.99%, respectively, but not limited thereto; the hexamethylene diisocyanate is hexamethylene-1,6-diisocyanate (HDI); the isophorone diisocyanate is 3-isocyanatomethylene-3,5,5-trimethyl cyclohexyl isocyanate. More preferably, the isocyanate group-containing compound is hexamethylene-1,6-diisocyanate (HDI).

The compound containing a vinyl ether group for the preparation of (semi) crystalline vinyl functionalized polyurethane resins is preferably one or more selected from the group consisting of 6-hydroxyhexyl vinyl ether, 4-hydroxybutyl vinyl ether, 2-hydroxy ethyl vinyl ether and diethylene glycol monovinyl ether. More preferably, the compound containing a vinyl ether group is 4-hydroxybutyl vinyl ether.

Further, component C comprising at least one (semi) crystalline vinyl functionalized polyurethane resin solid reactive diluent has a number average molecular weight Mn of at least 100 Da, preferably at least 200 Da, more preferably at least 300 Da. Component C comprising at least one (semi) crystalline vinyl functionalized polyurethane resin solid reactive diluent having a number average molecular weight Mn of at most 8000 Da, preferably at most 6000 Da, more preferably at most 4000 Da, further preferably at most 2000 Da.

That is, the number average molecular weight Mn of component C is preferably 100-8000 Da, more preferably 300-2000 Da. The molecular weight size is related to the melt viscosity, and when the number average molecular weight Mn of component C is within the above range, the molecular weight is small, and the melt viscosity is low.

Component C comprising at least one (semi) crystalline vinyl functionalized polyurethane resin solid reactive diluent has a melting point of at least 30° C., preferably at least 35° C., more preferably at least 45° C., still more preferably at least 55° C. Component C comprising at least one (semi) crystalline vinyl functionalized polyurethane resin solid reactive diluent has a melting point of at most 120° C., preferably at most 110° C., more preferably at most 105° C., even more preferably at most 100° C. The melting point of component C is within the above-mentioned range to ensure that it is lower than the temperature of the curing reaction of the powder coating.

That is, the melting point of component C is preferably 30-110° C., more preferably 55-100° C. The melting point of component C is within the above-mentioned range to ensure that it is lower than the temperature of the curing reaction of the powder coating.

Component C comprising at least one (semi) crystalline vinyl functionalized polyurethane resin solid reactive diluent has a vinyl ether functional group equivalent weight of at least 100 g/mol, preferably at least 300 g/mol. Component C comprising at least one (semi) crystalline vinyl functionalized polyurethane resin solid reactive diluent has a vinyl ether functional group equivalent weight of at most 4000 g/mol, preferably at most 2500 g/mol, more preferably at most 1500 g/mol, more preferably at most 1000 g/mol.

That is, the vinyl ether functional group equivalent weight of component C is preferably 100-4000 g/mol, more preferably 100-1000 g/mol, further preferably 300-1000 g/mol.

Component C comprising at least one (semi) crystalline vinyl functionalized polyurethane resin solid reactive diluent has a viscosity at 100° C. of at least 0.01 Pa·s, preferably at least 0.05 Pa·s, more preferably at least 0.1 Pa·s, further preferably, at least 0.5 Pa·s. Component C comprising at least one (semi) crystalline vinyl functionalized polyurethane resin solid reactive diluent has a viscosity at 100° C. of at most 20 Pa·s, preferably at most 15 Pa·s, more preferably at most 10 Pa·s, further preferably at most 5 Pa·s, particularly preferably at most 1 Pa·s.

That is, the viscosity of component C at 100° C. is preferably 0.01-20 Pa·s, more preferably 0.01-1 Pa·s, and further preferably 0.5-1 Pa·s. Component C with a lower melt viscosity can reduce the viscosity of the reaction system and act as a diluent in the reaction system.

In summary, component C satisfies the following conditions:
a. Component C has a number average molecular weight Mn of 100-8000 Da;
b. the vinyl ether functional group of Component C has an equivalent weight of 100-4000 g/mol;
c. Component C has a melting point of 30-110° C., and a crystallization point of 20-80° C.;
d. Component C has a viscosity of 0.01-20 Pa·s at 100° C.

In the present invention, component C adopts a solid reactive diluent containing (semi) crystalline vinyl functionalized polyurethane resin, which can reduce the melt viscosity of the powder coating composition at 90-110° C., so that the molecules of the each reaction component are mixed and form intermolecular contacts to a level of the one in liquid coating, allowing the Michael addition reaction complete quickly, thereby ensuring that the low-temperature powder coating composition can be heat cured to an acceptable level at 90-110° C. in 3-10 minutes.

Further, component C is obtained by the following method:

(1) Adding a compound containing a vinyl ether group, an auxiliary agent and water into a reaction apparatus, heating to 35-50° C. under nitrogen protection and stirring;

preferably, the compound containing the vinyl ether group, the auxiliary agent, and water are added to the reaction apparatus, and heated to 40-45° C. under nitrogen protection and stirring. Wherein, the auxiliary agent includes a catalyst, an antioxidant, etc., but is not limited thereto. The reaction apparatus is a four-necked flask equipped with a thermometer, a stirrer and a distillation device.

(2) Slowly adding dropwise the isocyanate group-containing compound into the reaction apparatus at a temperature of 35-50° C.

Preferably, the isocyanate group-containing compound is slowly added dropwise to the reaction apparatus at a temperature of 40° C. More preferably, a radical polymerization inhibitor is also added in this step, that is, in the step, the isocyanate group-containing compound and the radical polymerization inhibitor are slowly added dropwise to the reaction apparatus under a temperature preservation condition of 40° C.

(3) After adding the isocyanate group-containing compound, keeping a temperature of the reaction apparatus to lower than 110° C. for 30 minutes, and then removing low molecular weight volatiles by vacuuming to obtain a final product.

Preferably, after adding the isocyanate group-containing compound, keeping the temperature of the reaction apparatus lower than 110° C. for 30 minutes, and removing low molecular weight volatiles at 110° C. to obtain a final product. The final product has a number average molecular weight Mn of 100-8000 Da, a melting point $T_m$ of 30-110° C., and an vinyl ether functional group equivalent weight of 100-4000 g/mol.

Component D comprises at least one solid substance containing an epoxy group. Component D is an epoxy resin containing an epoxy group, an acrylic polyester containing an epoxy group or an epoxy curing agent. Preferably, the solid substance containing the epoxy group is a solid epoxy resin or epoxy curing agent. Specifically, the solid epoxy resin can be one or more selected from the group consisting of bisphenol A epoxy resin, bisphenol F epoxy resin, phenolic modified epoxy resin, and glycidyl ester epoxy resin, but is not limited thereto. Preferably, the solid epoxy resin is one or more selected from the group consisting of bisphenol A epoxy resin and phenolic modified epoxy resin. More preferably, the solid epoxy resin is bisphenol A epoxy resin.

Component D that is an epoxy curing agent is preferably one or more selected from the group consisting of triglycidyl isocyanurate and polyglycidyl benzoate.

Preferably, the epoxy resin containing the epoxy group and the acrylic polyester containing the epoxy group have a number average molecular weight of 200-2000 Da, and an epoxy equivalent weight of 100-1000 g/equivalent.

When preparing the heat-curable powder coating composition of the present invention, component D is divided into component F and component G with same or different weights. Based on the total amount of component D added, component F is added in a range of 1-35 wt %, and component G is added in a range of 1-35 wt %. Preferably, component F is added in 5-30 wt % of the total amount of component A, component B and component C added, and component G is added in 5-30 wt % of the total amount of component A, component B and component C added. More preferably, based on the total amount of component D added, component F is used in 10-25 wt % of the total amount of component A, component B and component C, and component G is used in 10-25 wt % of the total amount of component A, component B and component C.

Component E comprises at least one basic catalyst capable of promoting the ring-opening reaction of epoxy resins at a temperature of 70-100° C. Preferably, component E may be a common imidazole, tertiary amine or phosphine basic catalyst, quaternary amine or phosphine basic catalyst.

It should be noted that there can be various embodiments of component E, as long as it promotes the ring-opening reaction of the epoxy resin at a temperature of 70-100° C.

Further, regarding the content of each component, based on a total amount of i)+ii)+iii), the content of component A comprising at least one amorphous solid polyester resin is at least 1 wt %, preferably at least 2 wt %, more preferably at least 6 wt %, further preferably at least 10 wt %. Based on a total amount of i)+ii)+iii), the content of component A comprising at least one amorphous solid polyester resin is at most 90 wt %, preferably at most 80 wt %, more preferably at most 70 wt %, further preferably at most 65 wt %.

That is, based on a total amount of i)+ii)+iii), the content of component A comprising at least one amorphous solid polyester resin is preferably 1-90 wt %, more preferably 10-65 wt %.

In the powder coating composition of the present invention, based on a total amount of i)+ii)+iii), the content of component B comprising at least one amorphous ethylenically unsaturated solid polyester resin is at least 0.5 wt %, preferably at least 2 wt %, more preferably at least 3 wt %, further preferably at least 5 wt %. Based on a total amount of i)+ii)+iii), the content of component B comprising at least one amorphous ethylenically unsaturated solid polyester resin is at most 90 wt %, preferably at most 80 wt %, more preferably at most 70 wt %, further preferably at most 60 wt %.

That is, based on a total amount of i)+ii)+iii), the content of component B comprising at least one amorphous ethylenically unsaturated solid polyester resin is preferably 0.5-90 wt %, more preferably 5-60 wt %.

In the powder coating composition of the present invention, based on a total amount of i)+ii)+iii), the content of component C comprising at least one (semi) crystalline vinyl functionalized polyurethane resin solid reactive diluent is at least 0.1 wt %, preferably at least 0.5 wt %, more preferably at least 1 wt %, further preferably at least 2 wt %. Based on a total amount of i)+ii)+iii), the content of component C comprising at least one (semi) crystalline vinyl functionalized polyurethane resin solid reactive diluent is at most 60 wt %, preferably at most 50 wt %, more preferably at most 40 wt %, further preferably at most 30 wt %.

That is, based on a total amount of i)+ii)+iii), the content of component C comprising at least one (semi) crystalline vinyl functionalized polyurethane resin solid reactive diluent is preferably 0.1-60 wt %, more preferably 2-30 wt %.

The total amount of component A, component B and component C added is 100 wt %.

In the powder coating composition of the present invention, based on a total amount of i)+ii)+iii), the content of component D comprising at least one epoxy group-containing solid substance is at least 0.1 wt %, preferably at least 0.5 wt %, more preferably at least 1 wt %, still more preferably at least 3 wt %. Based on a total amount of i)+ii)+iii), the content of component D comprising at least one epoxy group-containing solid substance is at most 50 wt %, preferably at most 45 wt %, further preferably at most 40 wt %.

That is, based on a total amount of i)+ii)+iii), the content of component D comprising at least one epoxy group-containing solid substance is preferably 0.1-50 wt %, more preferably 3-40 wt %.

In the powder coating composition of the present invention, based on a total amount of i)+ii)+iii), the content of component E comprising at least one basic catalyst is at least 0.05 wt %, preferably at least 0.08 wt %, more preferably at least 0.15 wt %, still more preferably at least 0.3 wt %. Based on a total amount of i)+ii)+iii), the content of component E comprising at least one basic catalyst is at most 30 wt %, preferably at most 25 wt %, more preferably at most 20 wt %, further preferably at most 15 wt %.

That is, based on the total amount of i)+ii)+iii), the content of the E component comprising at least one basic catalyst is preferably 0.05-30 wt %, more preferably 0.3-15 wt %.

The chemical reaction mechanism of the heat-curable powder coating composition of the present invention is as follows:

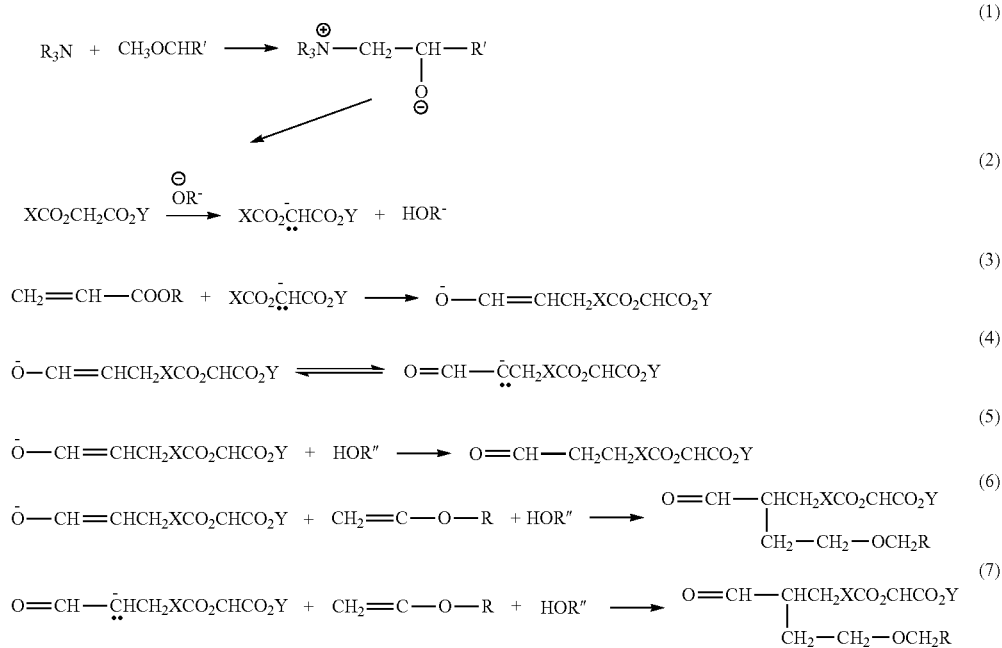

In the absence of UV and light or thermal initiators, the polymerization of an electron-deficient unsaturated C=C group and an electron-rich vinyl ether C=C group is initiated by an epoxy group ring-opening intermediate. This reaction mechanism is the key innovative technology of the present invention, which is disclosed and applied to powder coating compositions for the first time.

In the chemical reactions of the above (1), (2), (3), (4), (5), (6), (7) steps, R and R' can be the same or different groups, and can be substituents as alkyl, aryl, aralkyl and the like; X and Y in the chemical reactions of steps (2), (3), (4), (5), (6), (7) can be the same or different substituents such as alkoxy, alkyl, aryl, aralkyl and the like.

The present invention adopts (semi) crystalline vinyl ether functionalized polyurethane resin as a solid reactive diluent to reduce the melt viscosity of the powder coating composition at 90-110° C., so that the molecules of each reaction component are mixed and form intermolecular contacts to a mixing and contact level in liquid coatings, allowing the Michael addition reaction complete quickly to ensure that the low-temperature powder coating composition can be heat cured to an acceptable level at 90-110° C. in 3-10 minutes.

Referring to FIG. 1, it is a differential thermal scan (DSC) diagram of the heat-curable powder coating composition of the present invention. From the DSC curve diagram, it can be known that an initial temperature of the reaction of the present invention is 85.74° C., and a peak value of the reaction temperature is 100.64° C. The produced powder coating thus can be cured in a relatively shorter time below 100° C.

The invention utilizes a basic catalyst (tertiary amine) to initiate the opening reaction of an epoxy group at 70-100° C. to form an alkoxy anion, which can extract hydrogen proton from the acidic C-H contained in component A comprising the electron-rich amorphous solid polyester resin, and induce a curing reaction between the amorphous ethylenically unsaturated polyester resin of component B and the amorphous solid polyester resin of component A to form intermediates containing carbanions or enolate anions. A polymerization reaction is triggered between the intermediates containing carbanions or enolate anions which have the electron-deficient C=C unsaturated group and the electron-rich vinyl ether C=C unsaturated group. Since the (semi) crystalline vinyl ether functionalized polyurethane resin solid reactive diluent participates in the polymerization curing reaction of the low-temperature powder coating composition system which needs to be initiated by the intermediate containing carbanions or enolate anions that are produced by the curing reaction between the amorphous ethylenically unsaturated polyester resin (component B) and the amorphous solid polyester resin (component A), and the (semi)crystalline vinyl ether functionalized polyurethane resin solid reactive diluent has a very low melt viscosity at the curing temperature of 90-110° C., it is ensured that there is a sufficient melting time window for leveling during the curing reaction of the low-temperature powder coating composition which leads to a good leveling performance of the coating.

Moreover, the present invention aims to solve the problem that the melt-extrusion temperature of the low-temperature powder coating of 80-100° C. is in an overlapping range with the curing temperature of 90-110° C. required in the manufacturing process of the low-temperature powder coating. Based on the reaction principle of this low-temperature powder coating composition, component D that is an epoxy resin containing an epoxy group or an epoxy curing agent is selected as the key component that affects the curing and cross-linking reaction of the low-temperature powder coating composition. During melt-extrusion of the low-temperature powder coating composition at 80-100° C., only 0-70% of the required amount of the above-mentioned component in the low-temperature powder coating composition is added, to prevent a curing and cross-linking reaction of the low-temperature powder coating composition from occurring during the melt-extrusion at 80-100° C. And the remained epoxy resin containing the epoxy group or the epoxy curing agent is then dry mixed into an extrudate and pulverized together by dry jet milling.

For traditional polyester-epoxy hybrid low-temperature powder coatings, a process of dry-mixing epoxy resin process cannot achieve a curable coating. The main resin and related additives involved in the reaction of powder coatings must be melted and extruded to be able to form a complete cured coating, which is well known to those of ordinary skill in the powder industry. In the low-temperature powder coating composition of the present invention, the epoxy resin containing the epoxy group or the epoxy curing agent is the key component that causes the curing reaction, but is not the key film-forming substance for forming the coating. Tertiary amine or tertiary phosphine can carry out a ring-opening polymerization with the epoxy resin containing the epoxy group or the epoxy curing agent at 70-100° C., and the reaction speed is very fast, so the epoxy resin containing the epoxy group or the epoxy curing agent is selected to be added by dry mixing after a jet milling process instead of other components of the low-temperature powder coating composition of the present invention. And it is possible to adjust the amount of the epoxy resin containing the epoxy group or the epoxy curing agent to be jet milled and dry mixed, so that the curing reaction temperature of the low-temperature powder coating composition is adjustable in a scope greater than 90° C.

Under dry storage conditions at room temperature, the lower the curing temperature of the powder coating of the traditional polyester-epoxy hybrid reaction system, the easier it loses gloss, and the powder coating cured below 120° C. will lose its gloss within 7 days. The main reason is that the traditional polyester-epoxy hybrid reaction system will partially undergo epoxy ring-opening polymerization at room temperature, which is well known to those skilled in the powder industry. The present invention identifies the epoxy resin containing the epoxy group or the epoxy curing agent (component D) as the key component affecting the curing and crosslinking reaction of the low-temperature powder coating composition. When the low-temperature powder coating composition is melt-extruded at 80-100° C., only 0-70% of the amount of the above component in the low-temperature powder coating composition is added, and the remaining part of the epoxy resin containing the epoxy group or the epoxy curing agent is then dry-mixed into the extruded composition and jet pulverized together. Melt-extrusion mixing and dry mixing followed by jet pulverization process have a very distinctive impact on molecular dispersion, resulting in a huge difference in intermolecular contact and molecular thermal motion of the low-temperature powder coating composition, thereby inhibiting the reaction and polymerization speed of the low-temperature powder coating system at room temperature and improving the storage and gloss stability of the low-temperature powder coating and extending storage time of the low-temperature powder coating.

Further preferably, the present invention further elaborates on each component as follows:

Component A comprises at least one amorphous solid polyester resin having 2 or more acidic C-H Michael donor reactive groups, and the molecular structure of the group is as follows:

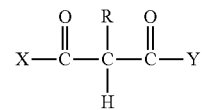

Wherein, R is H, alkyl or aryl, X and Y can be the same or different groups, X and Y are alkoxy, alkyl, aryl or aralkyl.

Preferably, component A comprises at least one amorphous solid polyester resin having 2 or more acidic C-H Michael donor reactive groups which is provided by a monomer such as malonic acid, acetoacetic acid, malonamide, acetamide, cyanoacetate and derivatives thereof; more preferably, provided by a monomer such as malonic acid, acetoacetic acid, malonamide, acetamide and derivatives thereof; even more preferably provided by a monomer such as malonic acid, acetoacetic acid, malonamide and derivatives thereof; most preferably provided by a monomer such as malonic acid, acetoacetic acid and derivatives thereof.

In the present invention, component A comprises at least one solid amorphous polyester resin, which is a product of a transesterification between an amorphous polyester resin and preferably a monomer such as malonic acid, acetoacetic acid, malonamide, acetamide, cyanoacetate and derivatives thereof, more preferably a monomer such as malonic acid, acetoacetic acid, malonamide, acetamide and derivatives thereof, even more preferably a monomer such as malonic acid, acetoacetic acid, malonamide and derivatives thereof, most preferably a monomer such as malonic acid, acetoacetic acid and derivatives thereof.

Component A comprising at least one solid amorphous polyester resin has at least 2 acidic C-H Michael donor reactive groups, preferably at least 3 acidic C-H Michael donor reactive groups, more preferably, at least 4 acidic C-H Michael donor reactive groups, further preferably at least 6 acidic C-H Michael donor reactive groups. Component A comprising at least one solid amorphous polyester resin has at most 25 acidic C-H Michael donor reactive groups, preferably at most 20 acidic C-H Michael donor reactive groups, more preferably, at most 15 acidic C-H Michael donor reactive groups, and further preferably at most 10 acidic C-H Michael donor reactive groups.

That is, component A comprising at least one solid amorphous polyester resin preferably has 2-20 acidic C-H Michael donor reactive groups, more preferably 6-10 acidic C-H Michael donor reactive groups.

Component A comprising at least one solid amorphous polyester resin has a number average molecular weight Mn of at least 500 Da, preferably at least 1000 Da, more preferably at least 1500 Da, further preferably at least 2000 Da. Component A comprising at least one solid amorphous polyester resin has a number average molecular weight Mn of at most 20000 Da, preferably at most 15000 Da, more preferably at most 10000 Da, further preferably at most 8000 Da.

That is, the number average molecular weight Mn of component A comprising at least one solid amorphous polyester resin is preferably in a range of 500-20000 Da, more preferably in a range of 2000-8000 Da.

Component A comprising at least one solid amorphous polyester resin has a glass transition temperature $T_g$ of at least 30° C., preferably at least 35° C., more preferably at least 45° C., further preferably at least 55° C. Component A comprising at least one solid amorphous polyester resin has a glass transition temperature $T_g$ of at most 110° C., preferably at most 100° C., more preferably at most 90° C., further preferably at most 85° C.

That is, the glass transition temperature $T_g$ of component A comprising at least one solid amorphous polyester resin is preferably in a range of 30-110° C., more preferably in a range of 55-85° C.

Component A comprising at least one solid amorphous polyester resin has an equivalent weight of the acidic C-H Michael donor reactive group of at least 150 g/mole, preferably at least 300 g/mol, more preferably at least 500 g/mol, further preferably at least 800 g/mol. Component A comprising at least one solid amorphous polyester resin has an equivalent weight of the acidic C-H Michael donor reactive group of at most 15000 g/mol, preferably at most 10000 g/mol, more preferably at most 8000 g/mol, further preferably at most 5000 g/mol.

That is, an equivalent weight of the acidic C-H Michael donor reactive group of component A comprising at least one solid amorphous polyester resin is preferably in a range of 150-15000 g/mol, more preferably in a range of 800-5000 g/mol mol.

Component A comprising at least one solid amorphous polyester resin has a viscosity of at least 1 Pa·s at 160° C., preferably at least 5 Pa·s, more preferably at least 10 Pa·s, further preferably at least 20 Pa·s. Component A comprising at least one solid amorphous polyester resin has a viscosity of at most 400 Pa·s at 160° C., preferably at most 300 Pa·s, more preferably at most 200 Pa·s, further preferably at most 100 Pa·s, particularly preferably at most 50 Pa·s.

That is, component A comprising at least one solid amorphous polyester resin has a viscosity preferably in a range of 1-400 Pa·s at 160° C., more preferably in a range of 1-50 Pa·s.

Component A comprising at least one solid amorphous polyester resin has an acid value (AV) of at least 0.5 mg KOH/g, preferably at least 1 mg KOH/g. Component A comprising at least one solid amorphous polyester resin has an acid value (AV) of at most 20 mg KOH/g, preferably at most 15 mg KOH/g, more preferably at most 10 mg KOH/g, further preferably at most 8 mg KOH/g, particularly preferably at most 5 mg KOH/g.

That is, Component A comprising at least one solid amorphous polyester resin has an acid value (AV) preferably in a range of 0.5-5 mg KOH/g, more preferably 1-5 mg KOH/g.

To sum up, component A satisfies the following conditions:
 a. Component A has a number average molecular weight Mn of 500-20000 Da;
 b. The acidic C-H Michael donor reactive group of component A has an equivalent weight of 150-15000 g/mol;
 c. Component A has a glass transition temperature $T_g$ of 30-110° C.;
 d. Component A has a viscosity of less than 400 Pa·s at 160° C.

The amorphous solid polyester resin of component A generally refers to a polycondensation product of a polyhydric alcohol and a polybasic acid, preferably the polycondensation product of dibasic acid and dihydric alcohol, and/or trifunctional alcohol and trifunctional carboxylic acid.

Wherein, polycarboxylic acids that can be used to prepare the polyester resin include but are not limited to isophthalic acid, terephthalic acid, phthalic acid, tetrahydrophthalic acid, hexahydroterephthalic acid, azelaic acid, adipic acid, sebacic acid, succinic acid, trimellitic acid, etc. These exemplary polycarboxylic acids can be used in their acid form, as well as in the form of acid anhydride, acid chloride or lower alkyl ester. Mixtures of the polycarboxylic acids can also be adopted, as well as the hydroxycarboxylic acids and lactones.

Polyols can be polycondensed with the above-mentioned polycarboxylic acids and derivatives thereof to prepare the polyester resin. Examples of the polyols include, but are not limited to, aliphatic diols, 2,2-dimethylpropane-1,3-diol (neopentyl glycol), propane-1,2-diol, propane-1,3-diol Diol, butane-1,3-diol, butane-1,2-diol, 2,3-butanediol.

Polyfunctional alcohols or carboxylic acids can be used to obtain branched polyester resins. Examples of the polyfunctional alcohols or carboxylic acids include, but are not limited to, glycerol, hexanetriol, tri(hydroxymethyl)ethane, trihydroxypropane, iso sorbitol, pentaerythritol, trimellitic acid, pyromellitic acid and dimethylolpropionic acid.

The polyester resin can be prepared by a well-known esterification reaction and/or a transesterification reaction, and the desired polyester resin product can be obtained by adjusting the ratio of COOH to OH and using organotin catalysts commonly used in esterification reactions.

In the present invention, component B comprises at least one amorphous ethylenically unsaturated solid polyester resin having 2 or more unsaturated C=C Michael acceptor reactive groups. The amorphous ethylenically unsaturated solid polyester resin is selected from the group consisting of a polyester resin, an acrylic resin, a polyurethane resin, an epoxy resin, a polyamide, a polyesteramide and a polyurea; more preferably selected from the group consisting of an acrylic resin, an unsaturated polyurethane resin, an unsaturated epoxy resin, an unsaturated polyamide, an unsaturated polyurea and combinations thereof; even more preferably selected from the group consisting of an acrylated polyester resin, an unsaturated polyester resin with a diacid-containing ethylenically unsaturated functional group, such as a 2-butenedioic acid-containing ethylenically unsaturated polyester resin.

The amorphous polyester resin of component B generally refers to a polycondensation product of a polyol and a polyacid, preferably a polycondensation product of dibasic acid, dibasic alcohol (diol), and/or a trifunctional alcohol, trifunctional carboxylic acid.

The polycarboxylic acids that can be used to prepare the polyester resin in the present invention include but are not limited to isophthalic acid, terephthalic acid, phthalic acid, tetrahydrophthalic acid, hexahydroterephthalic acid, azelaic acid, adipic acid, sebacic acid, succinic acid, trimellitic acid, 2-methyl-2-butenedioic acid, 2-butenedioic acid, itaconic acid and derivatives thereof, etc. These exemplary polycarboxylics can be used in their acid form, as well as in the form of acid anhydride, acid chloride or lower alkyl ester. Mixtures of the polycarboxylics can also be adopted, as well as the hydroxycarboxylic acids and lactones.

Polyols can be polycondensed with the above-mentioned polycarboxylic acids and derivatives thereof to prepare the polyester resins. Examples of the polyols include, but are not limited to, aliphatic diols, 2,2-dimethylpropane-1,3-diol (neopentyl glycol), propane-1,2-diol, propane-1,3-diol Diol, butane-1,3-diol, butane-1,2-diol, and 2,3-butanediol.

Polyfunctional alcohols or carboxylic acids can be used to obtain branched polyester resins. Examples of the polyfunctional alcohols or the carboxylic acids include, but are not limited to, glycerol, hexanetriol, tri(hydroxymethyl)ethane, trihydroxypropane, iso sorbitol, pentaerythritol, trimellitic acid, pyromellitic acid, and dimethylolpropionic acid.

The polyester resin can be prepared by a well-known esterification reaction and/or a transesterification reaction, and the desired polyester resin product can be obtained by adjusting the ratio of COOH to OH and using organotin catalysts commonly used in esterification reactions.

In the present invention, the ethylenically unsaturated functional group contained in component B can preferably exist in the middle of the main chain of the polyester resin, more preferably in the branch chain of the polyester resin, and most preferably at the end of a branched chain or at multiple ends of the polyester resin.

In the present invention, the amorphous acrylated unsaturated polyester resin is an unsaturated polyester containing an ethylenically unsaturated functional group derived from an acrylic monomer or derivatives thereof. In the acrylated polyesters resin, its ethylenically unsaturated functional group is generally at the end of the unsaturated polyester resin, and the acrylated polyester resin can be prepared by the following method: the first step is to prepare a polyester intermediate by a common polyester manufacturing method, and then an acrylic monomer or their derivatives are reacted with the polyester intermediates to form an unsaturated polyester resin containing ethylenically unsaturated functional groups at the ends. Preferably, component B is an amorphous ethylenically unsaturated solid polyester resin formed by copolymerizing acrylic acid and butenedioic acid monomers, wherein the butenedioic acid monomers include fumaric acid and maleic acid.

The amorphous unsaturated polyester resin comprises a diacid ethylenically unsaturated functional group which is one or more selected from the group consisting of 2-methyl-2-butenedioic acid, 2-butenedioic acid, itaconic acid and derivatives/isomers thereof.

Component B comprises the amorphous ethylenically unsaturated solid polyester resin having 2 or more unsaturated C=C Michael acceptor reactive groups, and each molecule of component B contains at least 2 unsaturated C=C Michael acceptor reactive groups, preferably at least 3 unsaturated C=C Michael acceptor reactive groups, more preferably at least 4 unsaturated C=C Michael acceptor reactive groups, further preferably at least 6 unsaturated C=C Michael acceptor reactive groups. Component B comprises the amorphous ethylenically unsaturated solid polyester resin having 2 or more unsaturated C=C Michael acceptor reactive groups, and each molecule of component B contains at most 25 unsaturated C=C Michael acceptor reactive groups, preferably at most 20 unsaturated C=C Michael acceptor reactive groups, more preferably at most 15 unsaturated C=C Michael acceptor reactive groups, further preferably at most 10 unsaturated C=C Michael acceptor reactive groups.

That is, the number of unsaturated C=C Michael acceptor reactive groups contained in each molecule of component B is preferably in a range of 2-25, more preferably in a range of 6-10.

Component B comprises the amorphous ethylenically unsaturated solid polyester resin having 2 or more unsaturated C=C Michael acceptor reactive groups, the number average molecular weight Mn of component B is at least 500 Da, preferably at least 800 Da, more preferably at least 1000 Da, further preferably at least 1500 Da. Component B comprises the amorphous ethylenically unsaturated solid polyester resin having 2 or more unsaturated C=C Michael acceptor reactive groups, the number average molecular weight Mn of component B is at most 20,000 Da, preferably at most 15,000 Da, more preferably at most 10000 Da, further preferably at most 8000 Da.

That is, the number average molecular weight Mn of component B is preferably in a range of 500-20000 Da, more preferably in a range of 1500-8000 Da.

Component B comprises the amorphous ethylenically unsaturated solid polyester resin having 2 or more unsaturated C=C Michael acceptor reactive groups, its glass transition temperature $T_g$ is at least 30° C., more preferably at least 35° C., even more preferably at least 45° C., most preferably at least 55° C. Component B comprises the amorphous ethylenically unsaturated solid polyester resin having 2 or more unsaturated C=C Michael acceptor reactive groups, its glass transition temperature $T_g$ is at most 110° C., preferably at most 100° C., more preferably at most 90° C., further preferably at most 85° C.

That is, the glass transition temperature $T_g$ of component B is preferably in a range of 30-110° C., more preferably in a range of 55-85° C.

Component B comprises the amorphous ethylenically unsaturated solid polyester resin having 2 or more unsaturated C=C Michael acceptor reactive groups, and the unsaturated C=C Michael acceptor reactive group has an equivalent weight of at least 150 g/mol, preferably at least 200 g/mol, more preferably at least 300 g/mol, further preferably at least 400 g/mol. Preferably, Component B comprises the amorphous ethylenically unsaturated solid polyester resin having 2 or more unsaturated C=C Michael acceptor reactive groups, and the unsaturated C=C Michael acceptor reactive group has an equivalent weight of at most 15000 g/mol, preferably at most 10000 g/mol, more preferably at most 8000 g/mol, even more preferably at most 5000 g/mol.

That is, the equivalent weight of the unsaturated C=C Michael acceptor reactive group of component B is preferably in a range of 150-15000 g/mol, more preferably 400-5000 g/mol.

Component B comprising the amorphous ethylenically unsaturated solid polyester resin having 2 or more unsaturated C=C Michael acceptor reactive groups has a viscosity at 160° C. of at least 1 Pa·s, preferably at least 5 Pa·s, more preferably at least 10 Pa·s, further preferably at least 20 Pa·s. Component B comprising the amorphous ethylenically unsaturated solid polyester resin having 2 or more unsaturated C=C Michael acceptor reactive groups has a viscosity at 160° C. of at most 400 Pa·s, preferably at most 300 Pa·s, more preferably at most 200 Pa·s, further preferably at most 100 Pa·s, particularly preferably at most 40 Pa·s.

That is, the viscosity of component B at 160° C. is preferably less than 400 Pa·s, more preferably less than 40 Pa·s, more preferably 1-40 Pa·s.

In summary, component B satisfies the following conditions:
  a. Component B has a number average molecular weight Mn of 500-20000 Da;
  b. An unsaturated C=C functional group of component B has an equivalent weight of 150-15000 g/mol;
  c. Component B has a glass transition temperature $T_g$ of 30-110° C.;
  d. Component B has a viscosity of less than 400 Pa·s at 160° C.

In the present invention, component E may be any basic catalyst that can promote the ring-opening reaction of an epoxy resin at a temperature of 70-100° C.

As a preferred embodiment, component E may be commonly used imidazole, tertiary amine or phosphine basic catalyst with a general structural formula $X(R)_3$, or quaternary amine or phosphine base catalyst with a general structural formula $X(R)_4$. More preferably, component E is a tertiary amine or phosphine basic catalyst with a general structural formula $X(R)_3$, wherein X may be N or P element, and R is the same or different alkyl, aryl, aralkyl containing 1-8 carbons.

Further, a base formulation of the heat-curable powder coating composition is formed by component A, component B, component C, component D and component E. On this basis, the present invention may also include component H containing one or more of a filler, a pigment, and an auxiliary agent.

It should be noted that component H may optionally include additives commonly used in powder coatings, including but not limited to a wax, a pigment, a filler, a leveling agent, an antioxidant, etc., wherein the pigment may be an inorganic pigment, an organic pigment, a mica, a metallic pigment, etc., but not limited thereto. The filler may be a silicate, a carbonate, a sulfate, etc., but not limited thereto.

Figure 2:
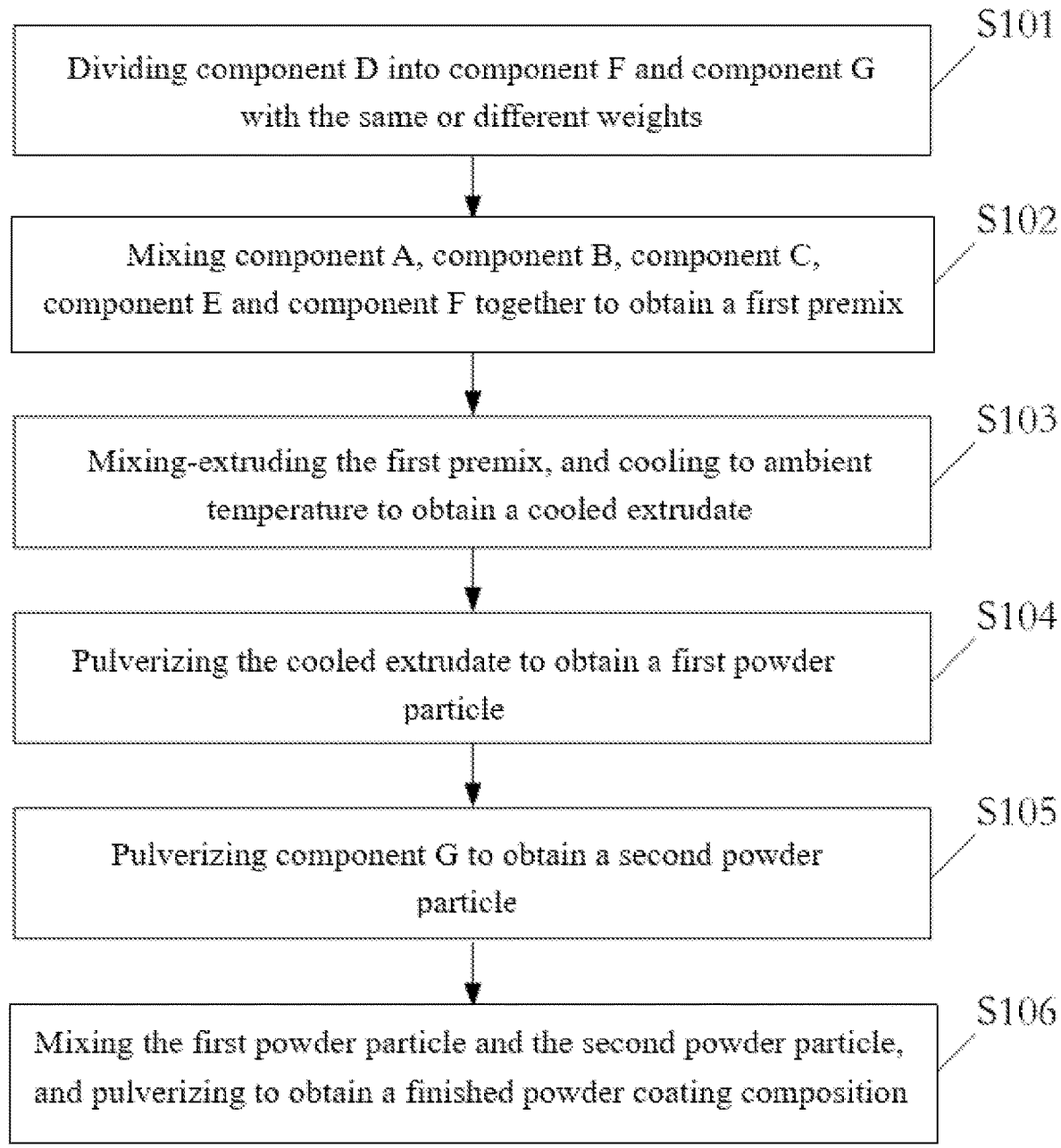
FIG. 2 is a flow chart of a preparation method of the heat-curable powder coating composition of the present invention.

Correspondingly, referring to FIG. 2, the present invention also discloses a preparation method of the heat-curable powder coating composition, comprising:

S101. dividing component D into component F and component G with the same or different weights;

According to the formulation of the powder coating composition, a certain amount of component D is determined and divided into component F and component G with the same or different weights. Based on the total amount of component D added, the content of component F is in a range of 1-35 wt %, and the content of component G is in a range of 1-35 wt %. Preferably, based on the total amount of component D added, the amount of component F used is 5-30 wt % of the total amount of component A, component B and component C, and the amount of component G is 5-30 wt % of the total amount of component A, component B and component C. More preferably, based on the total amount of component D added, the content of component F used is 10-25 wt % of the total amount of component A, component B and component C, and the content of component G used is 10-25 wt % of the total amount of component A, component B and component C.

S102, mixing component A, component B, component C, component E and component F together to obtain a first premix;

S103, mixing and extruding the first premix, cooling to ambient temperature to obtain an extrudate;

Preferably, the first premix is melt-mixed by a twin-screw extruder, and a temperature at the outlet of the twin-screw extruder is at most 110° C., preferably at most 100° C., more preferably at most 95° C., further preferably at most 90° C., particularly preferably at most 80° C.

S104. pulverizing the extrudate after cooling to obtain a first powder particle.

Preferably, the particle size $D_{50}$ of the first powder particles is 15-130 microns.

S105, pulverizing component G to obtain a second powder particles.

Preferably, component G is pulverized by a supersonic jet mill to obtain the second powder particle; the particle size $D_{50}$ of the second powder particle is 1-130 microns.

S106, mixing the first powder particle and the second powder particle, and pulverizing to obtain a powder coating composition as a finished product.

Preferably, the first powder particle and the second powder particle are mixed and pulverized by a fluid jet milling for powder coatings to obtain a finished powder coating composition.

In the above preparation method, component A, component B, component C, component E and part of component D (i.e., component F) are first mixed and extruded, cooled and pulverized to obtain the first powder particles; then, the remaining part of component D (i.e., component G) after being pulverized is mixed with the first powder particles to obtain the finished product.

Component D is divided into component F and component G, wherein, component F is added in step S102 and mixed with component A, component B, component C, component E, while component G is added in step S105. The present invention identifies component D comprising the epoxy resin containing the epoxy group or the epoxy curing agent as the key component that affects the curing and cross-linking reaction of the low-temperature powder coating composition. During the melt-extrusion step of preparation of the low-temperature powder coating composition at 80-100° C., only 0-70% of the required addition amount of the above-mentioned component in the formulation of the low-temperature powder coating composition is added to ensure that curing and cross-linking reactions of the above-mentioned low-temperature powder coating composition will not occur during the melt-extrusion at 80-100° C. The remaining part of the epoxy resin containing the epoxy group or the epoxy curing agent is then dry mixed and pulverized together by jet milling.

Moreover, the present invention adopts the process of pulverizing the epoxy resin containing the epoxy group or the epoxy curing agent by jet milling before dry mixing it into the powder coating, allowing the curing temperature of the low-temperature powder coating composition adjustable in a range of more than 90° C. by adjusting an addition amount of the epoxy resin containing the epoxy group or the epoxy curing agent.

In addition, under dry storage conditions at room temperature, the lower the curing temperature of the powder coating of the traditional polyester-epoxy hybrid reaction system, the easier it is to lose gloss. The powder coating cured below 120° C. will lose gloss within 7 days. The main reason is that the traditional polyester-epoxy hybrid reaction system will partially undergo an epoxy ring-opening polymerization reaction at room temperature, which is also well known to those skilled in the powder coating industry. In the present invention, by identifying the key component that affects the curing and crosslinking reaction of the low-temperature powder coating composition (component D comprising the epoxy resin containing the epoxy group or the epoxy curing agent). During the melt-extrusion step of the preparation of the low-temperature powder coating composition at 80-100° C., only 0-70% of the required addition amount of the above-mentioned component in the formulation of the low-temperature powder coating composition is added. The remaining part of the epoxy resin containing the epoxy group or the epoxy curing agent is then dry mixed and pulverized by jet milling together. Due to the huge dispersion effect difference between the melt-extrusion mixing and the dry mixing followed by jet pulverization, intermolecular contact and thermal motion in the low-temperature powder coating composition vary dramatically, thereby inhibiting the polymerization speed of low-temperature powder coating system at room temperature, improving the gloss stability of the low-temperature powder coating during storage, and extending its shelf life.

The present invention is further described below with specific examples.

1. PREPARATION STAGE (1) Preparation of Component A:

(a) Preparation of component A (M-BES): 0.74 equivalents of neopentyl glycol, 0.64 equivalents of isosorbide, 1.05 equivalents of terephthalic acid, 0.5 mmol of 4100 catalyst, 0.8 g of an antioxidant, and 8 g of water were added to a four-necked flask. The system is under nitrogen protection until water was discharged and heated to 280° C. to reduce the acid value to below 13 mg KOH/g, then cooled to 220° C. 0.04 equivalent of adipic acid was added, and then heated to 280° C. When the acid value was below 12 mg KOH/g, the system was cooled down to 220° C. and added with neopentyl glycol to make the acid value lower than 5 mg KOH/g. Cool the system down to 180° C., add 0.3 equivalent of diethyl malonate, gradually heat up to 220° C., then keep warm until no ethanol distilled. The system was vacuumed at 220° C. for 1 hour to obtain the final sample. The number average molecular weight Mn of the sample was 3790, the weight average molecular weight Mw was 8066, the acid value was 4.2 mg KOH/g, the glass transition temperature $T_g$ was 58° C., the hydroxyl value was 47 mg KOH/g and the equivalent weight of the malonic acid functional group was 1000 g/mol.

(2) Preparation of Component B:

(a) Preparation of component B (M-XS-1): Add 0.52 equivalent of neopentyl glycol, 0.33 equivalent of terephthalic acid, 0.3 mmol of 4100 catalyst, 0.8 g antioxidant, and 6 g of water to a four-necked flask with a thermometer, an agitator, and a distillation device. Stir under nitrogen protection until water was discharged. The system is heated to 240° C., then cooled to 180° C., added with 0.16 equivalent of fumaric acid and 0.7 g free radical polymerization inhibitor before heated to 210° C. for esterification. When the acid value is lower than 15 mg KOH/g and no water is released, the system is maintained at 210° C. and vacuumed for polymerization until the acid value is lower than 5 mg KOH/g to obtain the final product. The number average molecular weight Mn of the product was 2700, the acid value was 1.2 mg KOH/g, the glass transition temperature $T_g$ was 48° C., the hydroxyl value was 38 mg KOH/g, and the equivalent weight of the olefinic functional group was 700 g/mol.

(b) Preparation of component B (M-XS-2): 0.47 mol isophorone diisocyanate (IPDI), 0.2 mmol dibutyltin dilaurate (DBTL) and 0.6 g of 2,5-di-tert-butyl-1,4-p-phenylene diphenol were added to a 500 mL four-necked flask equipped with a thermometer, a stirrer, and a distillation device. Place 0.497 mol hydroxypropyl acrylate in a constant pressure dropping funnel and then add it to the four-necked flask at a constant temperature of 40° C. Take out the product obtained in the first step, transfer it into a dropping funnel wrapping with a heating tape and keep the temperature at around 55° C., and then add 0.209 mol glycerol dropwise to the reaction system to obtain the final product. The final product has a number average molecular weight Mn of 703, a glass transition temperature $T_g$ of 57° C., and an equivalent weight of the olefinic functional group of the final product was 350 g/mol.

(3) Preparation of Component C:

Preparation of component C (M-C30-1): Add 0.5 mol of 4-hydroxybutyl vinyl ether, 0.2 mmol of dibutyltin dilaurate, and 0.6 g antioxidant to a four-necked flask equipped with a thermometer, a stirrer and a distillation device, stir and heat to 40° C. under nitrogen protection. 0.25 mol of hexamethylene diisocyanate and 0.8 g free radical polymerization inhibitor were added to a constant pressure dropping funnel, and slowly added dropwise to the four-necked flask at 40° C. After adding 0.25 mol of hexamethylene diisocyanate, keep the temperature in the four-necked flask lower than 110° C. for 30 minutes, then vacuumize at 110° C. to remove low molecular weight volatiles to obtain the final product. The number average molecular weight Mn of the product is 400 Da, the melting point $T_m$ is 100° C., and the equivalent weight of the vinyl ether functional group is 200 g/mol.

Preparation of component C (M-C30-2): 0.385 mol 4-hydroxybutyl vinyl ether, 0.082 mol diethylene glycol, 0.2 mmol dibutyltin dilaurate, and 0.6 g antioxidant were added to a four-necked flask equipped with a thermometer, a stirrer and a distillation device, stir and heat to 40° C. under nitrogen protection. 0.275 mol hexamethylene diisocyanate and 0.8 g free radical polymerization inhibitor were added to a constant pressure dropping funnel, and then slowly added dropwise to the four-necked flask at 40° C. After adding 0.275 mol of hexamethylene diisocyanate, keep the temperature in the four-necked flask lower than 110° C. for 30 minutes, and then vacuumize at 110° C. to remove low molecular weight volatiles to obtain the final product. The number average molecular weight Mn of the product is 516 Da, the melting point of $T_m$ is 91° C. and the equivalent weight of vinyl ether functional groups is 260 g/mol.

(4) Preparation of Component E:

Preparation of catalyst EA-1: Mix 20 g triethylamine and 20 g alumina C uniformly to prepare a solid. The solid was well mixed with 360 g polyester resin that is used for low temperature curing with an acid value of 70 mg KOH/g. A resulting mixture was placed into a twin-screw extruder for extrusion. The extrusion temperature was controlled at 90° C. to prepare a master batch with a triethylamine content of 5%.

It should be noted that the acid value (AV) and hydroxyl value (OHV) of the resin are measured by titration according to ISO 2114-2000 and ISO 4629-2016, respectively or determined theoretically.

The number average molecular weight (Mn) of the resin is calculated according to the following formula: The functionality (G) of the target resin is multiplied by 56110 and then divided by the sum of the acid value (AV) of the target resin (mg KOH/g) and the hydroxyl value of the resin (OHV) (mg KOH/g), $Mn=(G \times 56110)/(AV+OHV)$.

2. EXAMPLES AND TEST RESULTS

Example 1

204 g component A (M-BES), which is the active hydrogen donor for the Michael addition reaction, 181 g component B (M-XS-2), which is the acceptor of Michael addition reaction, 50.35 g catalyst EA-1 prepared above, 6 g triglycidyl isocyanurate (TGIC), 51 g component C (M-C30-1) which is a reactive diluent, are mixed uniformly to obtain a mixture. The temperature of a extruder was set to 100° C., and the rotational speed was set to 300 rpm. The mixture is extruded through the extruder, then cooled, and pulverized with a coffee mill and sieved to prepare a powder coating material with an average particle size of 30 µm, namely the first powder particle P1.

Pulverize triglycidyl isocyanurate (TGIC) into a powder with an average particle size of 15 µm by jet milling to obtain a second powder particle P2. Mix P1 and P2 uniformly according to the ratio of 94:6, and put them into a jet mill for pulverization. Control the average particle size after the pulverization at 20-25 µm to obtain a final powder coating.

The powder coating prepared in Example 1 was sprayed on a medium density fiberboard (MDF) with a thickness of 15 mm by an electrostatic spray gun operating at a voltage of 60 kv. Put the sprayed MDF into an infrared oven at 100° C. for 3.5 minutes. Then the MDF was labeled as sample plate 1.

The powder coating obtained in Example 1 was sprayed on a bamboo charcoal plate with a thickness of 15 mm by an electrostatic spray gun operating at a voltage of 50 kv. The sprayed bamboo charcoal plate was placed in an infrared oven at 90° C. for 5 minutes. Then it is labeled as sample plate 2.

The powder coating prepared in Example 1 was sprayed on a glass fiber reinforced plastic plate with a thickness of 3 mm by an electrostatic spray gun operating at a voltage of 50 kv. Put the sprayed fiber reinforced plastic into an infrared oven at 100° C. for 4.5 minutes. Then it is labeled as sample plate 3.

Test the above three sample plates, and the test results are shown in Table 1:

TABLE 1

Powder coating test result table of Example 1

| Item | Sample plate 1 | Sample plate 2 | Sample plate 3 |
| --- | --- | --- | --- |
| Powder gelling time (100° C.) | 76 s | 76 s | 76 s |
| Powder gelling time (95° C.) | 100 s | 100 s | 100 s |
| Powder gelling time (90° C.) | 135 s | 135 s | 135 s |
| Film thickness | 61-88 µm | 60-92 µm | 67-90 µm |
| Gloss | 73% | 68% | 71% |
| Pencil hardness | H | H | H |
| Solvent resistance | Substrate not exposed after 100 rubs | Substrate not exposed after 100 rubs | Substrate not exposed after 100 rubs |
| Adhesion | 0 grade | 0 grade | 0 grade |
| Bubbles | No | No | No |
| Dimensional deformation | No | No | No |

As can be seen from Table 1, the gelling time of the powder coating of Example 1 was 76 seconds at 100° C., 100 seconds at 95° C., and 135 seconds at 90° C. It can also be seen from the solvent resistance results that the powder coating can be fully cured at 100° C. Other performance indicators, including gloss, hardness, adhesion, film formation (bubbles, dimensional deformation), etc., can all meet the performance requirement of the coating.

It should be emphasized that the bamboo charcoal board is a composite material made of PVC and bamboo charcoal fibers. Since PVC is a plastic, its softening point is 85° C. Although addition of bamboo charcoal fiber can increase its softening and deformation temperature, the curing of bamboo charcoal board above 100° C. can still lead to dimensional deformation. However, since the powder coating prepared by the present invention can start the curing reaction at 85° C., it can be applied on the bamboo charcoal board to improve its decorative properties.

Glass fiber reinforced plastic (GFRP) is a composite material made of vinyl resin and glass fiber. It is light and hard, non-conductive, stable in performance, high in mechanical strength and corrosion-resistant. It can replace steel to manufacture machine parts and shells for car and ship. However, due to the poor temperature resistance of GFRP products and the existence of many pores on the surface, when the GFRP is sprayed with powder coatings, if the temperature is too high, many bubbles will be generated. However, since the powder coating prepared by the present invention can start the curing reaction at 85° C., it can be applied on glass fiber reinforced plastic to improve its decorative properties.

Example 2

204 g component A (polyester resin M-BES), which is an active hydrogen donor for Michael addition reaction, 181 g component B (M-XS-2), which is an acceptor of Michael addition reaction, 50.35 g catalyst EA-1 prepared above, 12 g solid epoxy resin with epoxy equivalent of 200, and 51 g component C (M-C30-1) which is a reactive diluent, are mixed uniformly to obtain a mixture. The temperature of the extruder was set to 100° C., and the rotational speed was set to 300 rpm. The mixture is extruded through the extruder, then cooled, and pulverized with a coffee mill and sieved to prepare a powder coating material with an average particle size of 30 µm, namely the first powder particle P1.

Pulverize the epoxy resin with an epoxy equivalent of 200 into a powder with an average particle size of 15 µm by jet milling to obtain a second powder particle P2. Mix P1 and P2 uniformly according to the ratio of 92:8, and put a resulting mixture into a jet mill for pulverization. Control the average particle size after the pulverization at 15-20 µm to obtain a final powder coating.

The powder coating prepared in Example 2 was sprayed on a medium density fiberboard (MDF) with a thickness of 15 mm with an electrostatic spray gun operation at a voltage of 60 kv. Place the sprayed MDF board into an infrared oven at 100° C. for 3.5 minutes. Then it is labeled as sample plate 1.

The powder coating obtained in Example 2 was sprayed on a bamboo charcoal plate with a thickness of 15 mm by an electrostatic spray gun operating at a voltage of 50 kv. Place the sprayed bamboo charcoal plate in an infrared oven at 90° C. for 5 minutes. Then it is labeled as sample plate 2.

The powder coating prepared in Example 2 was sprayed on a glass fiber reinforced plastic plate with a thickness of 3 mm by an electrostatic spray gun operating at a voltage of 60 kv. Place the sprayed fiber reinforced plastic into an infrared oven at 100° C. for 4.5 minutes. Then it is labeled as sample plate 3.

Test the above three sample plates, and the test results are shown in Table 2:

TABLE 2

Powder coating test result table of Example 2

| Item | Sample plate 1 | Sample plate 2 | Sample plate 3 |
| --- | --- | --- | --- |
| Powder gelling time (100° C.) | 90 s | 90 s | 90 s |
| Powder gelling time (95° C.) | 125 s | 125 s | 125 s |

TABLE 2-continued

Powder coating test result table of Example 2

| Item | Sample plate 1 | Sample plate 2 | Sample plate 3 |
|---|---|---|---|
| Powder gelling time (90° C.) | 145 s | 145 s | 145 s |
| Film thickness | 60-90 μm | 64-90 μm | 60-82 μm |
| Gloss | 71% | 67% | 68% |
| Pencil hardness | H | H | H |
| Solvent resistance | Substrate not exposed after 100 rubs | Substrate not exposed after 100 rubs | Substrate not exposed after 100 rubs |
| Adhesion | 0 grade | 0 grade | 0 grade |
| Bubbles | No | No | No |
| Dimensional deformation | No | No | No |

As can be seen from Table 2, the gelling time of the powder coating of Example 2 was 90 seconds at 100° C., 125 seconds at 95° C., and 145 seconds at 90° C. It can also be seen from the solvent resistance results that the powder coating can be fully cured at 100° C. Other performance indicators, including gloss, hardness, adhesion, film formation (bubbles, dimensional deformation), etc., can all meet the performance requirement of the coating.

Example 3

285 g component A (M-BES) which is the active hydrogen donor for the Michael addition reaction, 253 g component B (M-XS-1) which is the acceptor for the Michael addition reaction, 70.49 g the catalyst EA-1 prepared above, 8 g triglycidyl isocyanurate (TGIC), 71.4 g component C (M-C30-1) which is a reactive diluent, are furtherly mixed uniformly with 4 g commercially available texture agent, 58 g titanium oxide, 23 g phthalocyanine green, 10 g iron yellow, 2.8 g carbon black, and 227 g barium sulfate to obtain a mixture. The temperature of the extruder was set to 100° C., and the rotational speed was set to 300 rpm. The mixture is extruded through the extruder, then cooled, and pulverized with a coffee mill and sieved to prepare a powder coating material with an average particle size of 30 μm, namely the first powder particle P1.

Pulverize triglycidyl isocyanurate (TGIC) into a powder with an average particle size of 15 μm by jet milling to obtain a second powder particle P2. Mix P1 and P2 uniformly according to the ratio of 93:7, and put them into a jet mill for pulverization. Control the average particle size after the pulverization at 15-20 μm to obtain a final powder coating.

The powder coating prepared in Example 3 was sprayed on a medium density fiberboard (MDF) with a thickness of 15 mm by an electrostatic spray gun operating at a voltage of 60 kv. Place the sprayed MDF into an infrared oven at 100° C. for 3.5 minutes. Then the MDF was labeled as sample plate 1.

The powder coating obtained in Example 3 was sprayed on a bamboo charcoal plate with a thickness of 15 mm by an electrostatic spray gun operating at a voltage of 50 kv. The sprayed bamboo charcoal plate was placed in an infrared oven at 90° C. for 5 minutes. Then it is labeled as sample plate 2.

The powder coating prepared in Example 3 was sprayed on a glass fiber reinforced plastic plate with a thickness of 3 mm by an electrostatic spray gun operating at a voltage of 60 kv. Place the sprayed fiber reinforced plastic into an infrared oven at 100° C. for 4.5 minutes. Then it is labeled as sample plate 3.

Test the above three sample plates, and the test results are shown in Table 3:

TABLE 3

Powder coating test result table of Example 3

| Item | Sample plate 1 | Sample plate 2 | Sample plate 3 |
|---|---|---|---|
| Powder gelling time (100° C.) | 68 s | 68 s | 68 s |
| Powder gelling time (95° C.) | 76 s | 76 s | 76 s |
| Powder gelling time (90° C.) | 120 s | 120 s | 120 s |
| Film thickness | 58-90 μm | 64-88 μm | 60-82 μm |
| Surface appearance | Green sand grain | Green sand grain | Green sand grain |
| Gloss | 18% | 12% | 15% |
| Pencil hardness | H | H | H |
| Solvent resistance | Substrate not exposed after 100 rubs | Substrate not exposed after 100 rubs | Substrate not exposed after 100 rubs |
| Adhesion | 0 grade | 0 grade | 0 grade |
| Bubbles | No | No | No |
| Dimensional deformation | No | No | No |

As illustrated in Table 3, the gelling time of the powder coating of Example 3 was 68 seconds at 100° C., 76 seconds at 95° C., and 120 seconds at 90° C. It can also be seen from the solvent resistance results that the powder coating can be fully cured at 100° C. Other performance indicators, including gloss, hardness, adhesion, film formation (bubbles, dimensional deformation), etc., can all meet the performance requirement of the coating.

The powder coating of the present invention can be applied to paint and decorate medium density fiberboard (MDF), bamboo charcoal board and glass fiber reinforced plastic plate, so as to improve their decorative property.

It should be noted that the gloss of the coating surface was measured at an incident angle of 60°.

The adhesion test is based on GB9286, and a scale of 0-5 corresponds to the adhesion from good to bad. The specific grading standard is described as: grade 0 represents the coating surface cutting edge is completely smooth, and there is no drop off.

Pencil hardness was tested according to ASTM3363.

The above are the preferred embodiments of the present invention. It should be pointed out that for those skilled in the art, without departing from the principles of the present invention, several improvements and modifications can also be made, and these improvements and modifications may also be regarded as fall in the protection scope of the present invention.

The invention claimed is:
1. A heat-curable powder coating composition, comprising:
   i) component A, comprising at least one amorphous solid polyester resin having a Michael donor reactive group;
   ii) component B, comprising at least one amorphous ethylenically unsaturated solid polyester resin having a Michael acceptor reactive group;
   iii) component C, comprising at least one crystalline solid reactive diluent or semi crystalline solid reactive diluent;

iv) component D, comprising at least one solid substance containing an epoxy group; and
v) component E, comprising at least one basic catalyst;
the crystalline solid reactive diluent or the semi crystalline solid reactive diluent has a melt viscosity of no higher than 200 mPa·s at 100° C., which can reduce the melt viscosity of the powder coating reaction system, and increase the reaction speed of the coating system.

2. The heat-curable powder coating composition according to claim 1, wherein component C comprises at least one crystalline vinyl functionalized polyurethane resin or semi crystalline vinyl functionalized polyurethane resin.

3. The heat-curable powder coating composition according to claim 2, wherein component C comprises at least one crystalline vinyl ether functionalized polyurethane resin or semi crystalline vinyl ether functionalized polyurethane resin containing a vinyl ether functional group.

4. The heat-curable powder coating composition according to claim 2, wherein component C is a product of a reaction between a compound containing a vinyl ether group or a vinyl ester group or a vinyl ether-ester group and/or a derivative of the compound, and an isocyanate group-containing compound and/or a derivative of the isocyanate group-containing compound.

5. The heat-curable powder coating composition according to claim 4, wherein the isocyanate group-containing compound is one or more selected from the group consisting of toluene diisocyanate, hexamethylene diisocyanate and isophorone diisocyanate;
wherein the toluene diisocyanate is a mixture of toluene 2,6-diisocyanate and toluene 2,4-diisocyanate;
wherein the compound containing the vinyl ether group is one or more selected from the group consisting of 6-hydroxyhexyl vinyl ether, 4-hydroxybutyl vinyl ether, 2-hydroxyethyl vinyl ether, and diethylene glycol monovinyl ether.

6. The heat-curable powder coating composition according to claim 4, wherein component C is obtained by the following method:
adding a compound with a vinyl ether group, an auxiliary agent and water into a reaction apparatus, stirring under nitrogen protection, and heating to 35-50° C.;
slowly adding an isocyanate group-containing compound dropwise to the reaction apparatus at a temperature of 35-50° C.; and
after adding the isocyanate group-containing compound, keeping a temperature of the reaction apparatus lower than 110° C. for 30 minutes, and then removing low molecular weight volatiles by vacuuming to obtain a final product.

7. The heat-curable powder coating composition according to claim 4, wherein component C satisfies at least one of the following conditions:
a. component C has a number average molecular weight Mn of 100-8000 Da;
b. the vinyl ether functional group of component C has an equivalent weight of 100-4000 g/mol;
c. component C has a melting point of 30-110° C. and a crystallization point of 20-80° C.; and
d. component C has a viscosity of 0.01-0.2 Pa·s at 100° C.

8. The heat-curable powder coating composition according to claim 1, wherein component A comprises at least one amorphous solid polyester resin having 2 or more C-H Michael donor reactive groups, and the molecular structure of the Michael donor reactive group is as follows:

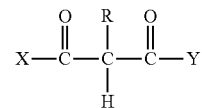

wherein R is H, alkyl or aryl; X and Y are identical or different groups, X and Y are alkoxy, alkyl, aryl or aralkyl.

9. The heat-curable powder coating composition according to claim 1, wherein component B comprises at least one amorphous ethylenically unsaturated solid polyester resin having 2 or more unsaturated C=C Michael acceptor reactive groups.

10. The heat-curable powder coating composition according to claim 1, wherein
component D is an epoxy resin containing an epoxy group, an acrylic polyester containing an epoxy group, or an epoxy curing agent.

11. The heat-curable powder coating composition according to claim 1, wherein component E comprises at least one basic catalyst promoting a ring-opening reaction of an epoxy resin at 70-100° C.

12. The heat-curable powder coating composition according to claim 1,
wherein a total amount of component A, component B and component C added is 100 wt %;
component D is added in an amount of 0.1-50 wt % of the total amount of component A, component B and component C;
component E is added in an amount of 0.05-30 wt % of the total amount of component A, component B and component C.

13. A preparation method of the heat-curable powder coating composition according to claim 1, comprising:
1) Dividing component D into component F and component G with the same or different weights;
2) Mixing component, A, component B, component C, component E and component F together to obtain a first premix;
3) Mixing-extruding the first premix, and cooling to ambient temperature to obtain an extrudate;
4) Pulverizing the extrudate after cooling to obtain a first powder particle;
5) Pulverizing component G to obtain a second powder particle; and
6) mixing the first powder particle and the second powder particle, and pulverizing to obtain a powder coating composition as a final product.

14. The preparation method of the heat-curable powder coating composition according to claim 13, wherein an amount of component F used is 1-35 wt % of a total amount of component A, component B and component C; and an amount of component G used is 1-35 wt % of the total amount of component A, component B and component C.

* * * * *